US010533539B2

(12) United States Patent
Nielsen et al.

(10) Patent No.: US 10,533,539 B2
(45) Date of Patent: Jan. 14, 2020

(54) CABLE INTERFACE FOR A WIND POWER FACILITY

(71) Applicant: Vestas Wind Systems A/S, Aarhus N. (DK)

(72) Inventors: Thomas Ingemann Nielsen, Århus (DK); Frederik Rytter, Randers (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 15/738,647

(22) PCT Filed: Jul. 1, 2016

(86) PCT No.: PCT/DK2016/050233
§ 371 (c)(1),
(2) Date: Dec. 21, 2017

(87) PCT Pub. No.: WO2017/005267
PCT Pub. Date: Jan. 12, 2017

(65) Prior Publication Data
US 2018/0187657 A1 Jul. 5, 2018

(30) Foreign Application Priority Data

Jul. 3, 2015 (DK) .................................. 2015 70440

(51) Int. Cl.
*F03D 80/80* (2016.01)
*F03D 1/06* (2006.01)
(Continued)

(52) U.S. Cl.
CPC .............. *F03D 80/85* (2016.05); *F03D 13/20* (2016.05); *F03D 80/00* (2016.05);
(Continued)

(58) Field of Classification Search
CPC ...... F03D 80/85; F03D 13/20; F05B 2230/60; F05B 2260/30; F05B 2230/61; Y02P 70/523; Y02E 10/726
(Continued)

(56) References Cited

U.S. PATENT DOCUMENTS 6,713,891 B2 * 3/2004 Kirkegaard .............. H02G 7/00
290/44
7,982,330 B1 * 7/2011 Ueno ...................... F03D 13/20
290/55
(Continued)

FOREIGN PATENT DOCUMENTS

CN 202001193 U 10/2011
EP 2696123 A1 2/2014
(Continued)

OTHER PUBLICATIONS

European Patent Office, International Search Report and Written Opinion in PCT Application No. PCT/DK2016/050233, dated Sep. 27, 2016.
(Continued)

*Primary Examiner* — Tan Le
(74) *Attorney, Agent, or Firm* — Wood Herron & Evans LLP

(57) ABSTRACT

A cable interface system (20) for connecting internal cabling of a wind power facility (10), the cable interface system (20) comprising: a tower interface (32) associated with a tower (14) of the wind power facility (10), the tower interface comprising a support structure (80, 90) that is arranged to support a set of tower cables (36) in a fixed configuration; a nacelle interface (30) associated with a nacelle (18) of the wind power facility (10), the nacelle interface comprising a support structure (40) that is arranged to support a set of nacelle cables (34) in a fixed configuration; wherein the tower interface (32) is dockable with the nacelle interface
(Continued)

(30) so that each tower cable (36) generally aligns with and can be joined to a corresponding nacelle cable (34).

12 Claims, 8 Drawing Sheets

(51) Int. Cl.
| | | |
|---|---|---|
| *F03D 7/04* | (2006.01) | |
| *F03D 9/11* | (2016.01) | |
| *H01B 7/00* | (2006.01) | |
| *H02G 11/00* | (2006.01) | |
| *H02G 15/08* | (2006.01) | |
| *F03D 80/00* | (2016.01) | |
| *F03D 13/20* | (2016.01) | |

(52) U.S. Cl.
CPC ....... *F05B 2230/60* (2013.01); *F05B 2230/61* (2013.01); *F05B 2260/30* (2013.01); *Y02E 10/726* (2013.01); *Y02P 70/523* (2015.11)

(58) Field of Classification Search
USPC ............... 248/58, 65, 68.1, 74.1; 290/44, 55
See application file for complete search history.

(56) References Cited

U.S. PATENT DOCUMENTS

| 8,247,170 B2* | 8/2012 | Gygax | C12Q 1/689 435/6.1 |
| 8,866,330 B2* | 10/2014 | Domesle | F03D 13/20 290/55 |
| 9,551,326 B2* | 1/2017 | Caspari | H02G 3/32 |
| 2009/0206610 A1* | 8/2009 | Martin | F03D 80/82 290/55 |

FOREIGN PATENT DOCUMENTS

| JP | 2009240021 A | 10/2009 |
| KR | 101368777 B1 | 3/2014 |
| WO | 2010108538 A1 | 9/2010 |
| WO | 2015014640 A1 | 2/2015 |

OTHER PUBLICATIONS

Danish Patent and Trademark Office, Search and Examination Report in PA 2015 70440, dated Jan. 28, 2016.

* cited by examiner

CABLE INTERFACE FOR A WIND POWER FACILITY

TECHNICAL FIELD

The invention relates to a cable interface for a wind power facility, in particular, but not exclusively, to an interface for aiding installation of internal cables of such a facility.

BACKGROUND TO THE INVENTION

Wind power facilities including a wind turbine mounted on top of a support structure such as a tower typically include internal cabling that runs from a nacelle of the turbine to the bottom of the tower and beyond. The cabling may include, for example, power transmission lines to deliver electrical power produced by the turbine generator to an external power grid, internal power cables for powering auxiliary systems, and data cables carrying control data and/or measurement data between the nacelle and remote systems, for example a SCADA (supervisory control and data acquisition) system.

Large wind power facilities cannot be transported to a site in an assembled state, and so must be erected at the site. This entails installing and connecting the internal cabling at the site, which is difficult, time-consuming, and potentially hazardous; particularly in the case of offshore wind power facilities. There is therefore a desire to ease the process of cable installation to reduce the time required to perform this task.

It is known to use a rigid curved steel tube, or 'J-tube', disposed within the tower of the wind power facility to act as a guide and support for a transmission line that is drawn up through the J-tube until reaching a transition piece that ultimately supports the line. Electrical connections to the line can then be made as required. The J-tube ensures that bending of the transmission line is controlled, thereby preventing damage to the line during and after installation. EP2696123 discloses a development on this theme, in which a flexible reinforced protective tube is used to protect the transmission line, the line and the protective tube being lifted together to the transition piece.

While such arrangements ease moving the transmission line into position, they do not help with the complicated task of making electrical connections to components of the wind turbine. Wind power facilities may have one or more cable bundles, each potentially containing dozens of individual cables. For example, bulky high voltage power transmission cables are often divided into bundles of multiple cables to improve flexibility. Connecting each of these cables within the nacelle represents a considerable burden on the installer.

It is against this background that the invention has been devised.

SUMMARY OF THE INVENTION

In a first aspect, the embodiments of the invention provide a cable interface system for connecting internal cabling of a wind power facility, the cable interface system comprising:
  a tower interface associated with a tower of the wind power facility, the tower interface comprising a support structure that is arranged to support a set of tower cables in a fixed configuration;
  a nacelle interface associated with a nacelle of the wind power facility, the nacelle interface comprising a support structure that is arranged to support a set of nacelle cables in a fixed configuration;
  wherein the support structure of the nacelle interface comprises a respective terminal for each nacelle cable, each terminal being arranged to receive an end of a respective nacelle cable,
  wherein the tower interface is dockable with the nacelle interface so that each tower cable generally aligns with and can be joined to a corresponding nacelle cable.

Advantageously, the invention provides a nacelle unit that is self-contained in the sense that power transmission cables are already connected to the power generation components that are located in the nacelle. The interface system can be assembled offsite, and then the nacelle interface and the tower interface can be brought together during erection of the wind turbine so as to complete the electrical connections. This makes the assembly process of the wind turbine more time efficient since it removes the task of making the cable connections from the 'critical path' of the assembly process.

The support structure of the nacelle interface may include a terminal for each nacelle cable, each terminal being arranged to receive an end of a respective nacelle cable.

In an embodiment of the invention each terminal is selected from a group of compression or mechanical connectors.

The high voltage DC cables require a secure and permanent connector to function reliably. This is achieved with a compression or mechanical connector.

In the context of the present application the term "terminal" or "connector" uses the definition of the International Electrotechnical Commission (IEC) IEV ref. 461-17-03: "metallic device to connect cable conductors together".

To the skilled person the term "compression connector" is known to be a connector type that uses the technique of "compression jointing" to establish a permanent connection between conductors. "Compression jointing" is defined in International Standard IEC 61238-1 as a "method of securing a connector to a conductor by using a special tool to produce permanent deformation of the connector and the conductor.

To the skilled person the term "mechanical connector" is known to be a connector type that uses the technique of "mechanical jointing" to establish a permanent connection between conductors. "Compression jointing" is defined in International Standard IEC 61238-1 as a "method of securing a connector to a conductor, for example by means of a bolt or screw acting on the latter by alternative methods".

Compression and mechanical connectors are commercially available connector types used to establish a permanent connection between two conductors, i.e. between the conductors of the nacelle cables and the tower cables.

In order that the tower interface may be brought towards the nacelle interface, the nacelle interface may include a winch. The winch may connect to a coupling on the tower interface so that the tower interface can be raised for docking with the nacelle interface.

In one embodiment the support structure of the tower interface includes a set of apertures, each of which receives one of the tower cables, the apertures serving to keep the cables in proper alignment and in a spaced configuration. Each aperture may include a lock arranged to secure the respective one or more tower cables within the aperture such that an end of the or each tower cable is exposed for connection to a corresponding nacelle cable.

In one embodiment, the nacelle interface and the tower interface may include complementary docking formations arranged to engage with each other for docking of the tower interface with the nacelle interface. Beneficially, the docking formations may include a lock that prevents disengagement of the docking formations. Personnel can therefore work on the cables at and below the tower interface whilst the lock is in place but before full connection between the docking formations has been completed.

In another aspect the invention resides in a nacelle interface that provides one or more external connection points for one or more corresponding nacelle cables residing within a nacelle of a wind power facility, the connection points enabling each nacelle cable to be connected to a respective cable supported below the nacelle, the nacelle interface comprising a support structure that is arranged to support the nacelle cables in a fixed configuration.

In a further aspect, the invention resides in a tower interface arranged to support a set of tower cables within a tower of a wind power facility, the tower interface comprising a support structure that is arranged to support the set of tower cables in a fixed configuration, the tower interface being arranged to dock with the nacelle interface (of claim 12 so that each tower cable aligns with a corresponding nacelle cable.

BRIEF DESCRIPTION OF THE DRAWINGS

So that it may be more fully understood, the invention will now be described, by way of example only, with reference to the following drawings, in which.

DETAILED DESCRIPTION OF EMBODIMENTS OF THE INVENTION

Figure 1:
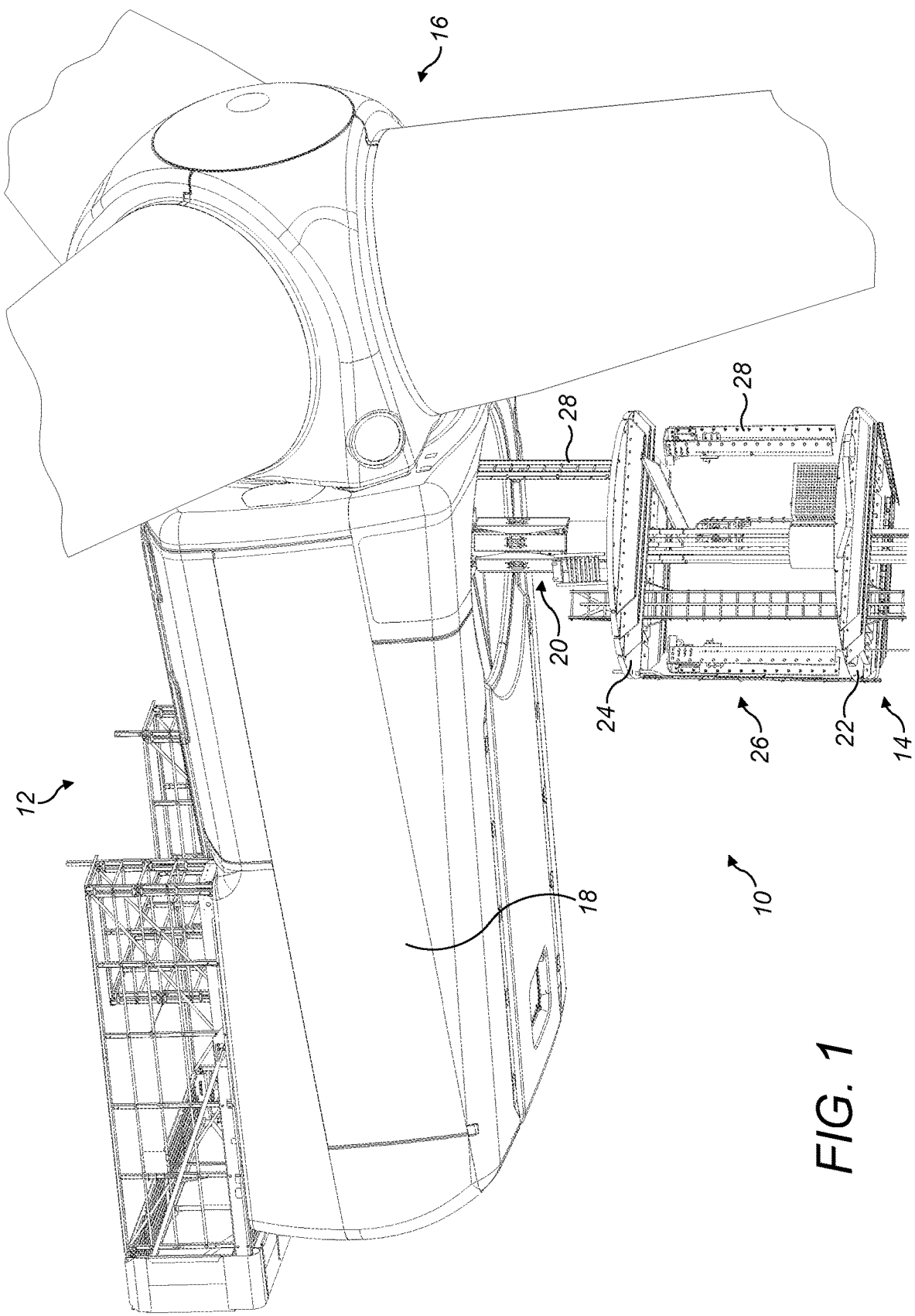
FIG. 1 is a perspective view of a portion of a tower-mounted wind turbine including a cable interface according to an embodiment of the invention.

Referring firstly to FIG. 1, an upper portion of a wind power facility 10 is shown. The wind power facility (10) includes a wind turbine 12 mounted on top of a tower 14, the wind turbine 12 being composed of a rotor 16 supported by a nacelle 18. The nacelle 18 houses a generator arranged to convert kinetic energy of the rotor 16 into electrical energy, as well as various auxiliary systems providing cooling, control and monitoring, for example.

To aid understanding of the internal structure of the wind power facility 10, FIG. 1 shows the tower 14 as transparent to reveal internal features such as platforms. It should be appreciated that in reality the tower 14 is a tubular structure that encases these internal features, which as a result are not externally visible. Similarly, the blades depicted in this figure are incomplete in that only some internal structure of the blades is visible, whereas the outer aerodynamic shells of the blades have been omitted. It is also worth noting the relatively small scale of FIG. 1; towers 14 of modern utility scale wind power facilities are known to have diameters in excess of five meters, allowing internal space for personnel.

As noted above, various internal cables run between the nacelle 18 and the bottom (not visible in FIG. 1) of the tower 14, delivering power and data to external terminals. FIG. 1 shows a cable interface 20 according to an embodiment of the invention that facilitates installation of this cabling. The cable interface 20 is shown in more detail in FIGS. 2 to 8, but is referred to here to indicate its context within the wind power facility 10.

Two disc-like vertically spaced horizontal platforms 22, 24 are shown in FIG. 1, between them forming a cable hang-off structure 26 similar to those already known in the art. Access to and between the platforms 22, 24 at various locations, both at the perimeters of the platforms 22, 24 and the centres, is provided by way of ladders 28, to ensure that personnel can access the cables for installation.

As the wind power facility 10 is assembled on site, rather than during manufacture, the internal cabling cannot be completely installed prior to transporting the facility 10 to the site. In this embodiment, to minimise the installation effort required at the site, bulky bundles of power transmission cables (which may be 'low' or 'high' voltage) are provided in two sections: a nacelle portion that resides inside the nacelle 18, and a tower portion that connects to its respective nacelle portion and extends down the length of the tower 14 and beyond. Lighter cables such as those for data transmission or low-voltage internal power cables are easier to handle for installation and so are not divided into portions.

The nacelle portions of the cables are connected to the output of a rectifier attached to the wind turbine generator, to transmit DC electrical power, via the tower portions once connected, to an inverter at the bottom of the tower 14. The inverter produces an AC supply for an external power grid, and it should be noted that the inverter is not shown in FIG. 1 since the tower bottom is not shown in FIG. 1; only an upper portion of the tower is shown. The free ends of the nacelle portions are gathered into a bundle by the cable interface 20, for subsequent connection to their respective tower portions. It is noted that the generator equipment and the external connections are not visible in the figures, and are described here to provide context.

This arrangement provides a self-contained nacelle unit that can be assembled off-site, in which power transmission cables are already connected to the nacelle rectifier. This removes the task of making those connections from the 'critical path', namely the series of tasks that cannot be completed in parallel and so define the overall assembly period.

Once the wind power facility 10 has been assembled, the tower portions are drawn up the tower 14 for connection with their corresponding nacelle portions. The cable interface 20 minimises the burden of connecting the portions of the power transmission cables in situ by orienting each of the nacelle portions and tower portions so that they locate opposite one another once they reach the hang-off structure 26, ready for quick connection, as shall become clear in the description that follows.

For now, it is observed that the cable interface 20, once installed, is suspended from a lower surface of the nacelle 18 to hang above the uppermost platform 24 of the hang-off structure 26. This arrangement locates the connection points between the cable portions generally at eye-level for a person standing on the uppermost platform 24, which eases installation.

Figure 2:
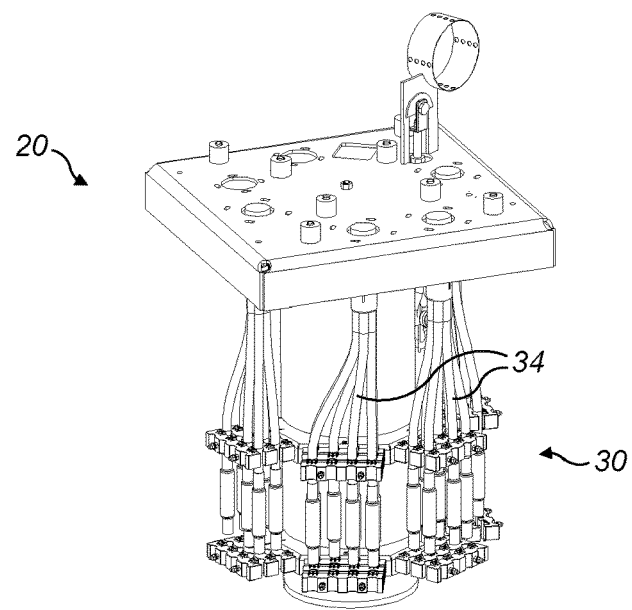
FIG. 2 is a front perspective view of a cable interface according to an embodiment of the invention.
Figure 2:
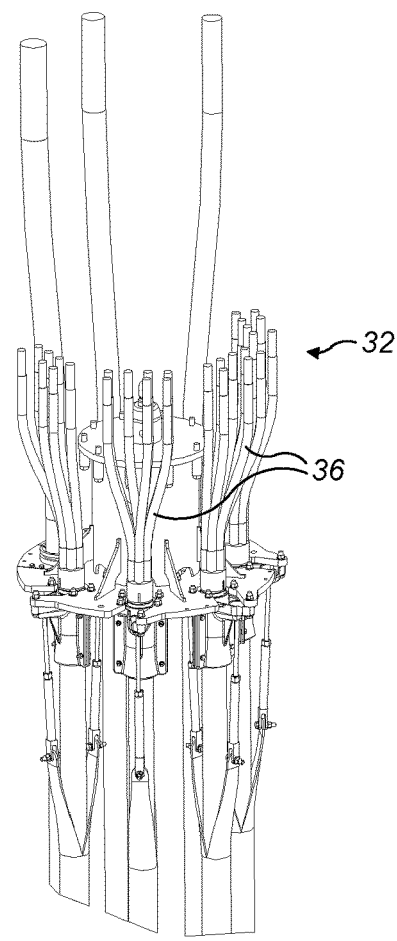
Figure 3:
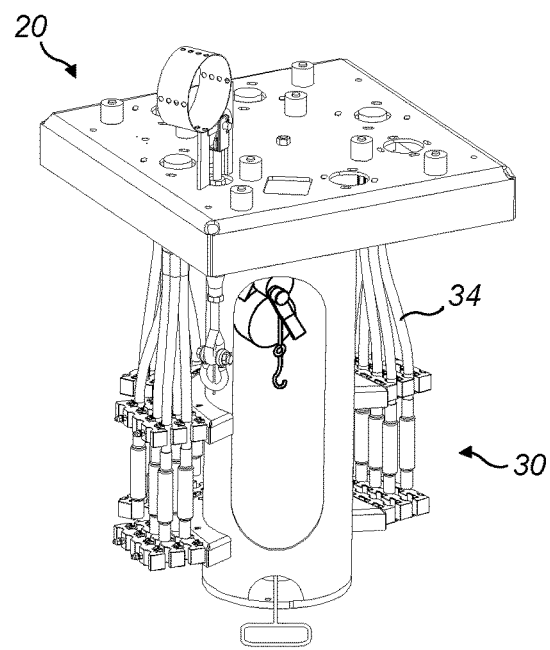
FIG. 3 is a rear perspective view of the cable interface shown in FIG. 2.
Figure 3:
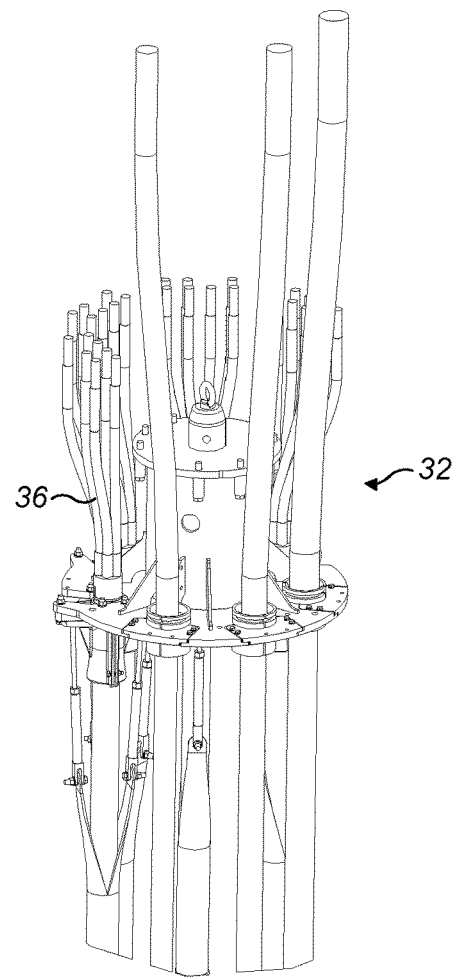

Moving on now to FIGS. 2 and 3, the cable interface 20 is shown in isolation in disassembled state, making clear that that cable interface 20 is composed of two distinct subassemblies: a nacelle interface 30, shown uppermost in FIGS. 2 and 3; and a tower interface 32. These interfaces are configured for inter-engagement so as to hold nacelle portions 34 and tower portions 36 respectively of the facility cables securely in position during final installation.

In this embodiment, the nacelle interface 30 forms part of the nacelle 18 and is assembled with the nacelle portions 34 before the wind turbine 12 is transported to the installation site for mounting onto the tower 14. The nacelle interface 30 holds the nacelle portions 34 in a pre-determined configuration. The tower interface 32 is used to support bundles of the tower portions 36 in a configuration that complements that of the nacelle portions 34, so that when the nacelle interface 30 and the tower interface 32 are brought together, corresponding pairs of nacelle portions 34 and tower portions 36 face each other in alignment and so can be connected quickly and easily.

Figure 4:
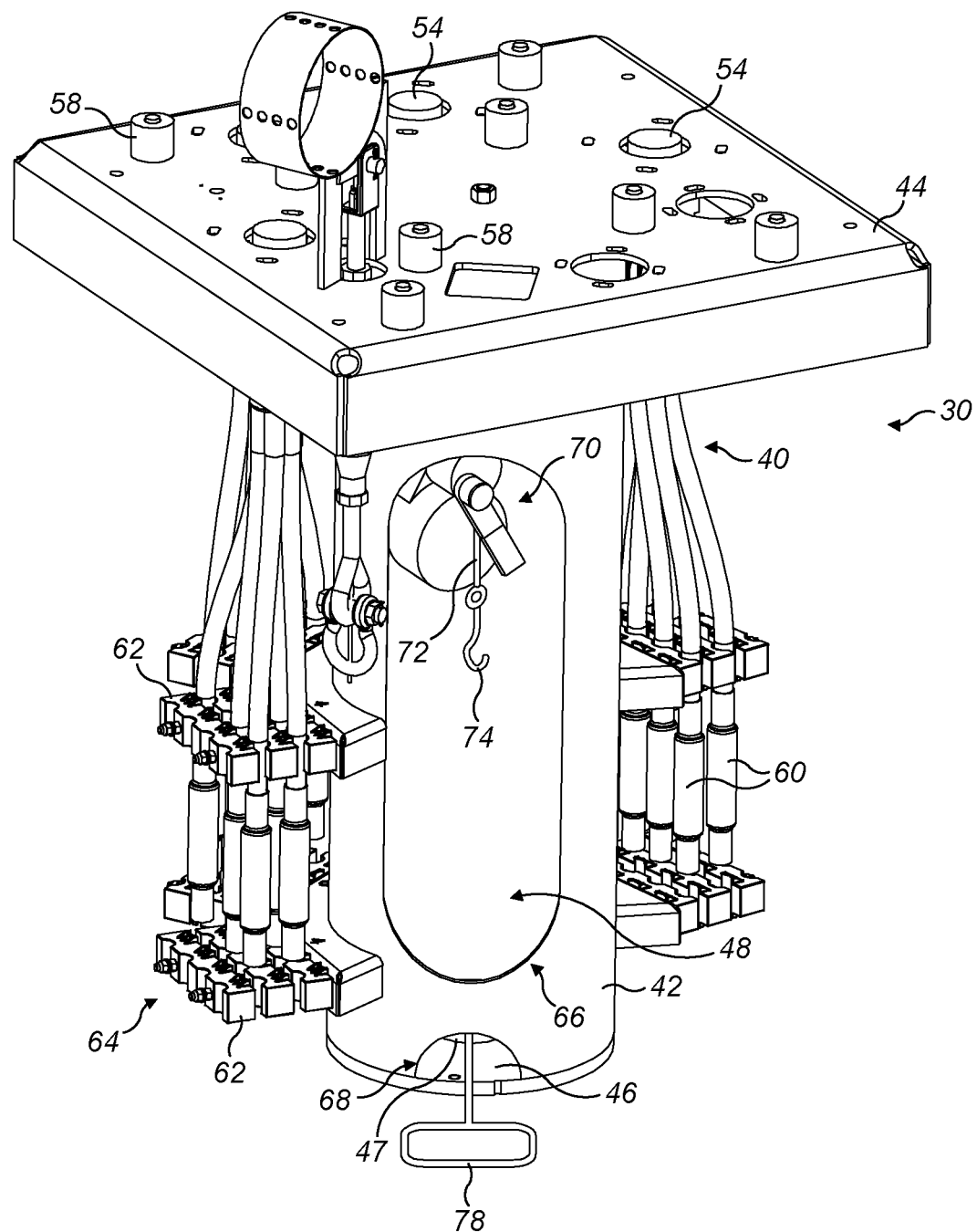
FIG. 4 corresponds to FIG. 3 but shows a detail view of a nacelle interface of the cable interface.

The nacelle interface 30 is shown in isolation in FIG. 4, and has a support structure 40 including means for guiding and supporting a range of cables about its circumference. The support structure 40 comprises a tubular engagement portion 42 extending away from and orthogonal to the centre of a lower face of a bulkhead 44, the engagement portion 42 terminating in an end face 46 to define an internal cavity 48. In this embodiment, the bulkhead 44 is shown as having a cuboid form, for illustrative purposes only.

Figure 5:
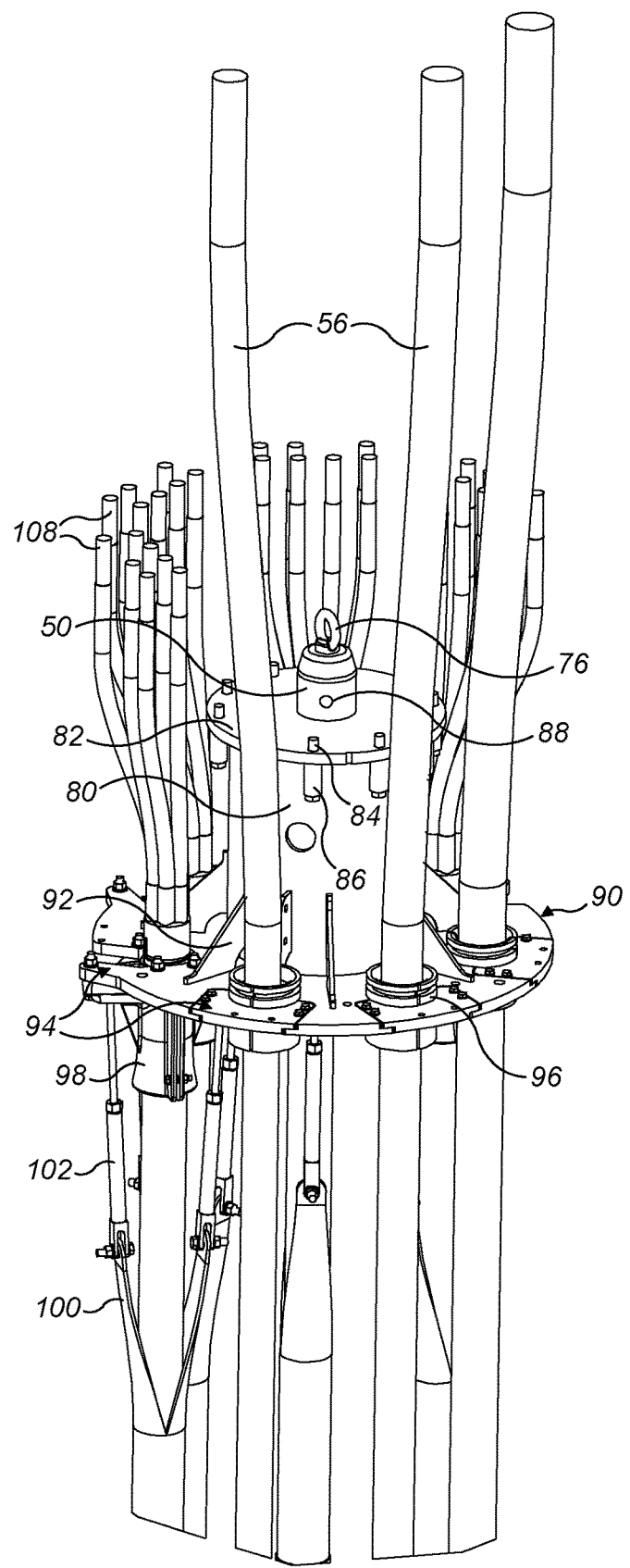
FIG. 5 corresponds to FIG. 3 but shows a detail view of a tower interface of the cable interface.

The end face 46 has a circular central opening 47 which is surrounded by a ring of smaller holes (not shown) that receive bolts for attachment of the tower interface 32. The central opening 47 is arranged to receive a nose 50 of the tower interface 32, which is shown in FIG. 5 and is described later, the nose 50 acting as a guide to locate the tower interface 32 with the engagement portion 42.

Figure 7:
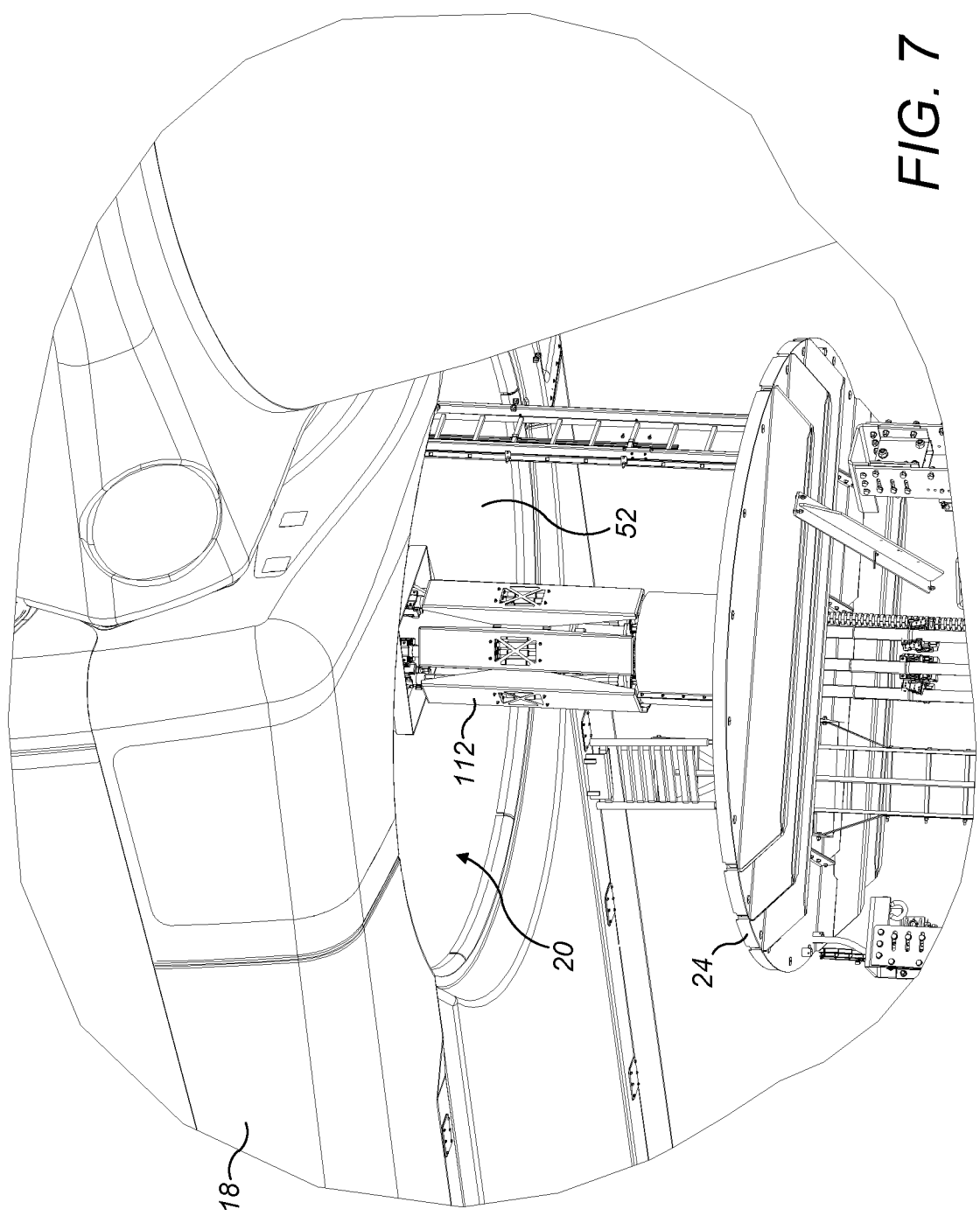
FIG. 7 corresponds to FIG. 1 but shows the tower-mounted wind turbine from below.

As depicted in FIG. 7, the bulkhead 44 secures to the underside of the nacelle, shown here as a lower surface 52, to cover an opening in that surface 52. Returning to FIGS. 2 and 3, the bulkhead 44 comprises several openings 54 that permit the bundles of nacelle portions 34 of the power transmission cables of the wind power facility 10 to exit the nacelle 18 for connection to corresponding tower portions 36. Further openings 54 are included to allow other, undivided cables 56, such as internal low voltage power cables and fibre optic data cables, to be fed into the nacelle 18. As noted earlier, these lighter cables 56 are fewer in number and easier to handle than the high voltage power transmission cables, and so can be connected up inside the nacelle 18 relatively quickly on site. However, optionally all internal cables can be provided in two portions and installed in the same manner as the high voltage power transmission cables.

FIG. 4 shows an array of cylindrical pips 58 protruding from the upper surface of the bulkhead 44. These pips 58 act as spacers between the bulkhead 44 and the nacelle 18 for enabling increased strain in the securing bolts for robust assembly.

Below the bulkhead 44, the bundles separate out into individual nacelle portions 34. Multiple arrays of connection points in the form of fixed terminals or connectors 60 are disposed around the engagement portion 42, one connector array for each bundle of cables. Each connector array is supported by a respective pair of clamp assemblies 62, with one clamp assembly 62 securing upper ends of the connectors 60, and the other clamp assembly 62 of the pair securing lower ends of the connectors 60. This defines an open block-like structure, such that each connector array can be considered a connector block 64 for a plurality of cables. Each individual nacelle portion 34 couples to a respective connector 60 of a connector block 64, for example by crimping, to create arrays of connection points to which respective tower portions 36 can connect.

The engagement portion 42 has two aligned openings formed in its side; the first opening 66 being generally oblong/oval and considerably larger than the second opening 68, which is semi-circular. The first opening 66 provides access to a winch 70 that resides within the cavity 48 of the engagement portion 42, suspended from the underside of the bulkhead 44. The winch 70 is operable to let out a chain 72 to lower a hook 74 through the central opening 47 of the end face 46 to couple to an eye bolt 76 of the tower interface 32, and then to recover the chain 72 to raise the tower interface 32 for engagement with the nacelle interface 30, as will be explained in more detail later.

The second opening 68 is smaller than the first, and provides an access point for a safety pin 78 whose function is to secure the tower interface 32 to the nacelle interface 30 temporarily while permanent fixings are made. This temporary coupling shall be described in more detail later, but it is noted here that the ability to couple the two interfaces 30, 32 quickly is a benefit as it enables personnel to work beneath the tower interface 32 to install the permanent fixings; due to health and safety regulations, personnel cannot work below a suspended load until it is secured in place with a mechanical fixing. Therefore, without the temporary fixing, personnel would be restricted to working from above the tower interface 32 to make the permanent coupling, which would be a hindrance that would increase the time required for this operation.

Figure 6:
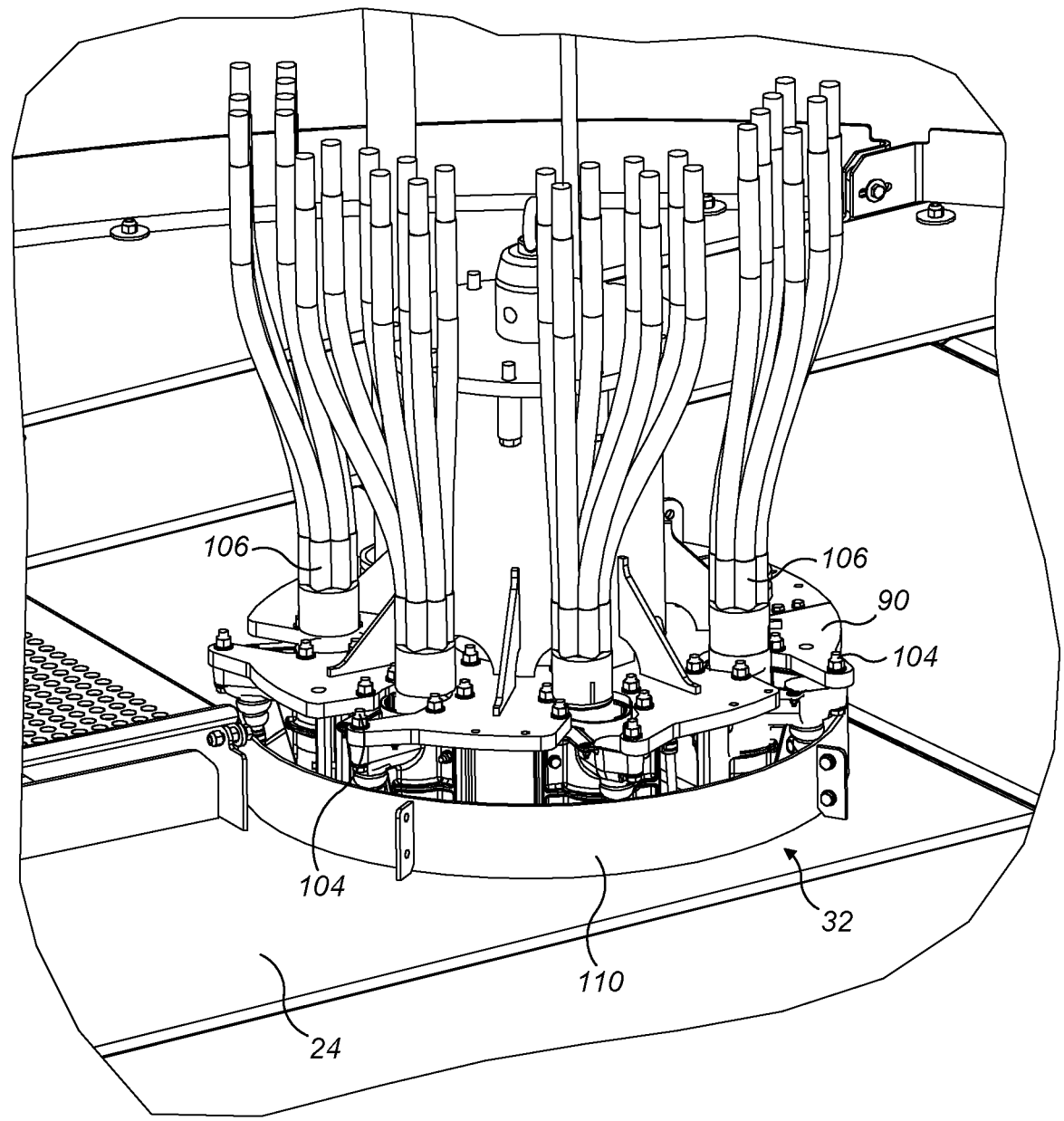
FIG. 6 corresponds to FIG. 5 but shows a detail view of a portion of the tower interface.

The tower interface 32 is shown in isolation in FIGS. 5 and 6, in which it can be seen that the tower interface 32 comprises a cylindrical main body 80 surmounted by a disc-like upper flange 82 extending radially to overhang the upper end of the main body 80 as a skirt. The overhang of the upper flange 82 includes a ring of equi-spaced holes 84 that correspond to the ring of smaller holes on the end face 46 of the engagement portion 42 of the nacelle interface 30. Beneath each hole 84 is a bolt collar 86 through which bolts can be inserted to secure the upper flange 82 to the engagement portion 42, thereby providing a permanent coupling between the tower interface 32 and the nacelle interface 30. The bolt collars 86 act to extend both the gripping surface for bolt heads, and the length of the coupling, thereby increasing strain in the bolts to provide a more robust coupling.

The nose 50 projects axially from the upper face of the upper flange 82, as viewed in FIG. 5. As noted above, the nose 50 is arranged for insertion through the central opening 47 of the end face 46 of the nacelle interface engagement portion 42, and into the cavity 48, to act as a guide and to provide a means by which the temporary coupling can be established. For this latter function, the nose 50 has a radial through-hole 88 for receiving the safety pin 78 of the nacelle interface 30. Accordingly, the through-hole 88 is spaced axially from the upper flange 82 to an extent that ensures that the through-hole 88 locates inside the cavity 48 of the engagement portion 42 of the nacelle interface 30 to allow access for the safety pin 78 to create the temporary coupling. Once the safety pin 78 is inserted into the through-hole 88, the safety pin 78 prevents withdrawal of the nose 50 from the cavity 48 and so provides a temporary coupling.

The eye bolt 76 is mounted on an upper face of the nose 50, the eye bolt 76 being used as an attachment point for the hook 74 of the winch 70 of the nacelle interface 30, to enable the winch 70 to lift the tower interface 32 for engagement with the nacelle interface 30.

A cable support 90 in the form of a second, larger flange is disposed at the lower end of the main body 80 of the tower interface 32, parallel to the upper flange 82. A series of support flanges 92 dispersed circumferentially around the main body 80 extend radially from the main body 80 and orthogonally to the cable support 90, to brace the structure.

The cable support 90 includes a series of apertures 94 spaced around its circumference, each aperture 94 being arranged to receive a cable or bundle of cables. To the front of the cable support 90, as viewed in FIG. 5, are three apertures 94 that receive two low voltage power cables and one fibre optic data cable. Each cable is held in place by a cable collar 96 that is a push-fit into the respective aperture 94. It should be noted that although these cables/bundles are shown as solid in the Figure, in reality the visible outer surface of the cable may be simply a light-weight flexible housing or conduit through which relatively light-weight cables extend.

Four bundles of high-voltage power transmission cable tower portions 36 are secured in respective apertures 94 around the rear of the cable support 90 as viewed in FIG. 5. Since the bundles are bulkier and heavier than the internal power and data cables, each bundle is secured by both a cable clamp 98 and a cable 'sock' 100. As shown more clearly in FIG. 6, the cable clamp 98 attaches by four bolts to the underside of the cable support 90 and clamps onto the cable bundle. The cable clamp 98 therefore acts as a lock to hold the bundle in place within the aperture 94. The cable sock 100, which is visible in the lower portion of FIG. 5, is a flexible sleeve, for example made from a metallic mesh, that envelops the cable and which tightens and thus grips the cable under the tension arising from self-weight of the cable. Each cable sock 100 is suspended between a pair of arms 102 that hang from the underside of the cable support 90 from fixing points 104 disposed to either side of the respective aperture 94, each fixing point 104 being secured by a bolt. The cable socks 100 therefore cooperate with the cable clamps 98 to provide additional support for the bundles.

Each bundle separates out into individual cables above the cable support 90. As shown more clearly in FIG. 6, a sleeve 106 is provided at the point where each bundle separates to ensure integrity of the junction. Free upper ends 108 of the individual cables are exposed to bare metal, to enable secure and reliable electrical connections to be made at the connection points of the nacelle interface 30. Optionally the free ends 108 may be swaged or crimped with ferrule connectors.

As FIG. 6 shows, a shield assembly 110 guards the cable support 90 where it rests just above the floor level of the upper platform 24 of the hang-off structure 26, for example to protect the cable support 90 from the feet of personnel.

Figure 8:
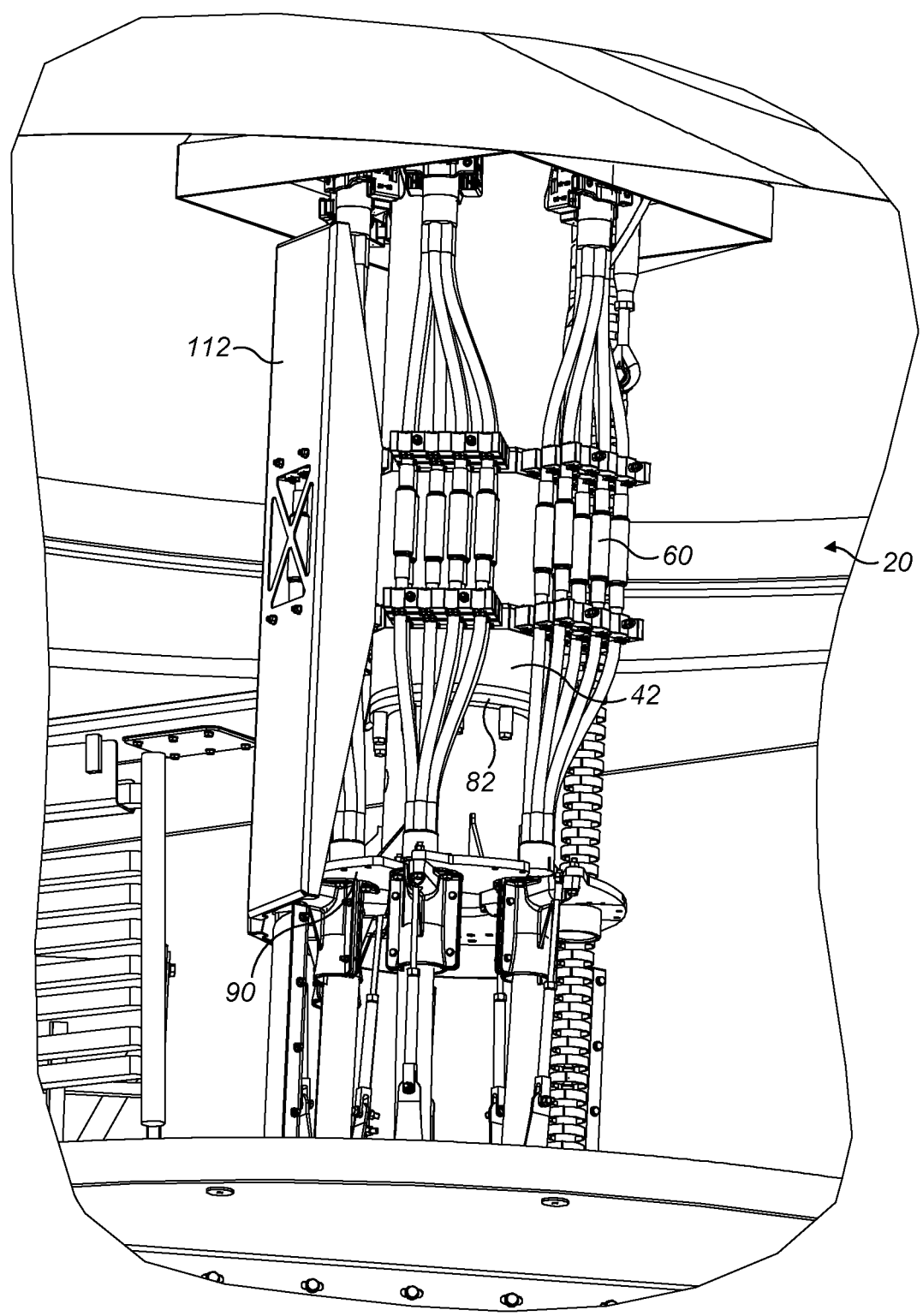
FIG. 8 corresponds to FIG. 1 but shows a detail view of the cable interface.

FIGS. 7 and 8 provide further context for the cable interface 20 in its operating position within the wind power facility 10. As shown in FIG. 7, once the tower interface 32 has been drawn up to engage with the nacelle interface 30, and the cable connections made, guards 112 are placed over the top of the clamp assemblies 62 that support the connection blocks 64 to protect the connection points thereafter.

In summary, the above described cable interface 20 eases installation of high voltage power transmission cables within a wind power facility 10 firstly by dividing those cables into two portions 34, 36, to enable connections inside the nacelle 18 to be made prior to assembling the facility 10 on site, and secondly by supporting those cable portions 34, 36 in pre-determined configurations, in alignment, and docking the cable portions 34, 36 in those configurations adjacent to each other. The process of connecting the cable portions 34, 36 together is therefore much more straightforward than prior art approaches for installing internal cables. This minimises the assembly operations required on site, which is an advantage as such operations are more challenging to complete on site than in a manufacturing facility.

The skilled person will appreciate that modifications may be made to the specific embodiments described above without departing from the inventive concept as defined by the claims. For example, the connector blocks 64 that are described above as mounted to the nacelle interface 30 could instead be placed on the tower interface 32, in which case the nacelle interface 30 might include a flange with apertures through which cables can dangle for connection to the terminals of the tower interface 32. Such an arrangement therefore mirrors that of the embodiment shown in the figures and described above.

The invention claimed is:

1. A wind power facility, comprising:
   a tower having a set of tower cables therein, each tower cable having a tower cable portion;
   a nacelle mounted on the tower, the nacelle having a set of nacelle cables extending therefrom, each nacelle cable having a nacelle cable portion; and
   a cable interface including:
      a tower interface having a tower support structure supporting the tower cable portions in a fixed configuration; and
      a nacelle interface having a nacelle support structure for supporting the nacelle cable portions in a fixed configuration, the nacelle support structure including a plurality of terminals;
   wherein each terminal non-removably couples one nacelle cable portion to a corresponding tower cable portion, and
   wherein each terminal prohibits rotation between ends of each nacelle cable portion and corresponding ends of each tower cable portion.

2. The wind power facility of claim 1, wherein each terminal is selected from a group of compression or mechanical connectors.

3. The wind power facility of claim 1, comprising a winch.

4. The wind power facility of claim 3, wherein the winch is integral with the nacelle interface.

5. The wind power facility of claim 1, wherein the tower interface comprises a coupling arranged to couple to a winch so that the winch can raise the tower interface to dock with the nacelle interface.

6. The wind power facility of claim 1, wherein the support structure of the tower interface comprises a set of apertures, each aperture being arranged to receive a respective one or more tower cables of the set.

7. The wind power facility of claim 6, wherein each aperture comprises a lock arranged to secure the respective one or more tower cables within the aperture such that an end of the or each tower cable is exposed for connection to a corresponding nacelle cable.

8. The wind power facility of claim 7, wherein the exposed ends of the tower cables are crimped or swaged.

9. The wind power facility of claim 1, wherein the nacelle interface and the tower interface comprise complementary docking formations arranged to engage with each other for docking of the tower interface with the nacelle interface.

10. The wind power facility of claim 9, comprising a docking formation lock that is arranged to prevent disengagement of the docking formations.

11. The wind power facility of claim 1, wherein the support structure of the nacelle interface and/or the tower interface is arranged to support cables that are undivided between the tower and the nacelle of the wind power facility.

12. A method for connecting a set of tower cables to a set of nacelle cables extending from a nacelle mounted on a tower of a wind power facility, each tower cable having a tower cable portion and each nacelle cable having a nacelle cable portion, the method comprising:
  providing a nacelle interface with a nacelle support structure coupled to the nacelle, the nacelle support structure including a plurality of terminals;
  providing tower interface with a tower support structure;
  non-removably coupling each nacelle cable portion to a respective one of the plurality of terminals;
  raising the tower interface up the tower of the wind power facility, the tower support structure supporting the tower cable portions;
  docking the tower interface with the nacelle interface; and
  non-removably coupling each tower cable portion to the corresponding one of the plurality of terminals coupled to the nacelle cable portion;
  wherein each terminal prohibits rotation between ends of each nacelle cable portion and corresponding ends of each tower cable portion.

* * * * *